(12) United States Patent
Liu

(10) Patent No.: US 8,180,938 B2
(45) Date of Patent: May 15, 2012

(54) METHOD, SYSTEM, AND COMPUTER PROGRAM PRODUCT FOR AUTOMATIC LEARNING OF SOFTWARE KEYBOARD INPUT CHARACTERISTICS

(75) Inventor: Pei-Hsing Liu, Taoyuan (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 73 days.

(21) Appl. No.: 12/649,576

(22) Filed: Dec. 30, 2009

(65) Prior Publication Data

US 2010/0169521 A1    Jul. 1, 2010

(30) Foreign Application Priority Data

Dec. 31, 2008    (TW) .............................. 97151911 A

(51) Int. Cl.
*G06F 13/12* (2006.01)
*G06F 3/041* (2006.01)

(52) U.S. Cl. ............ 710/67; 345/171; 345/173; 702/94; 702/95

(58) Field of Classification Search .................. None
See application file for complete search history.

(56) References Cited

U.S. PATENT DOCUMENTS

| 6,456,952 | B1 | 9/2002 | Nathan |
| 2003/0132922 | A1* | 7/2003 | Philipp ..................... 345/173 |
| 2004/0155869 | A1* | 8/2004 | Robinson et al. ......... 345/168 |
| 2004/0183833 | A1 | 9/2004 | Chua |
| 2006/0066590 | A1 | 3/2006 | Ozawa et al. |
| 2007/0182595 | A1* | 8/2007 | Ghasabian ................. 341/22 |
| 2009/0174667 | A1* | 7/2009 | Kocienda et al. ......... 345/169 |

OTHER PUBLICATIONS

IBM Technical Disclosure Bulletin, "Method to Improve the Usability of Touch-Screen Panels for Computer Applications", vol. 32 No. 9B Feb. 1990, pp. 250-253.

* cited by examiner

*Primary Examiner* — Eron J Sorrell
*Assistant Examiner* — Dean Phan
(74) *Attorney, Agent, or Firm* — Thomas, Kayden, Horstemeyer & Risley, LLP

(57) ABSTRACT

A method for automatic learning of software keyboard input characteristics includes the following steps. (a) An input is received. (b) Whether the input is a normal key input is determined. (c) The input value of the input is stored when the input is determined to be the normal key input. (d) Step (a)-(c) are repeated until (N+1) input values are stored, wherein N is a positive integer. (e) When there are (N+1) inputs stored, the input characteristics of the first input in the (N+1) inputs are determined according to the first stored input value in the stored (N+1) input values. A computer program product using the method and a system for automatic learning of software keyboard input characteristics are also disclosed herein.

21 Claims, 5 Drawing Sheets

METHOD, SYSTEM, AND COMPUTER PROGRAM PRODUCT FOR AUTOMATIC LEARNING OF SOFTWARE KEYBOARD INPUT CHARACTERISTICS

RELATED APPLICATIONS

This application claims priority to Taiwan Application Serial Number 97151911, filed Dec. 31, 2008, which is herein incorporated by reference.

BACKGROUND

1. Field of Invention

A method, a system, and a computer program product for automatic learning of software keyboard input characteristics are disclosed. More particularly, a method, a system, and a computer program product for automatic learning of software keyboard input characteristics by using delay in learning are disclosed.

2. Description of Related Art

For hand-held devices, the touch-based software keyboards are commonly used as the human-machine interface for data input. The touch-based software keyboards are rendered on the screen via software. However, since there are different user habits (such as personal parallax, different fingers used, ways to hold the device, or directions) when it comes to pressing down the software keys, errors might happen when mapping the touch coordinate to the input character. The software keyboards may not be able to correctly determine the desired user input, and errors are therefore generated accordingly.

Therefore, in order to enhance the accuracy of input determination, one approach is to provide the user with "training mode" through software. The software "pre-learns" the user's operating characteristics in the training mode in order to construct the coordinate calibration data. However, the shortcomings of this approach is that, when the user changes their personal operating habits or takes on other operating characteristics different from the training mode (such as switching from the left hand to right hand or the vice versa, or switching to another person), the calibration data would lose its effectiveness. The user needs to re-run the calibration program in the training mode to collect data from the user again.

Therefore, there is a need to provide a new automatic learning method to improve the aforementioned shortcomings.

SUMMARY

The objective of the disclosure is to provide a method, system, and computer program product for automatic learning of software keyboard input characteristics. There is no need to have a separate training mode to learn the user's operating characteristics in advance. If the user changes operating characteristics, an automatic learning and self-adaption may be performed accordingly.

According to one exemplary method for automatic learning of software keyboard input characteristics includes the following steps. (a) An input is received. (b) Whether the input is a normal key input is determined. (c) The input value of the input is stored when the input is determined to be the normal key input. (d) Step (a)-(c) are repeated until (N+1) input values are stored, wherein N is a positive integer. (e) When there are (N+1) inputs stored, the input characteristics of the first input in the (N+1) inputs are determined according to the first stored input value in the stored (N+1) input values.

According to another exemplary system for automatic learning of software keyboard input characteristics includes a receiving module, a storage unit, an input determining module, a placing module, and a characteristics determining system. The receiving module is for receiving an input. The storage unit is for storing the input value of the input. The input determining module is for determining whether the input is a normal key input. The placing module is for placing the input value of the input into the storage unit when the input determining module determines the input to be the normal key input. The characteristics determining system is for determining, according to the first stored input value in the stored (N+1) input values, the input characteristics of the first input in the (N+1) inputs when there are already (N+1) input values stored in the storage unit, wherein N is a positive number.

According to yet another exemplary computer program product includes program codes for executing the following steps. (a) An input is received. (b) Whether the input is a normal key input is determined. (c) The input value of the input is stored when the input is determined to be the normal key input. (d) Step (a)-(c) are repeated until (N+1) input values are stored, wherein N is a positive integer. (e) When there are (N+1) inputs stored, the input characteristics of the first input in the (N+1) inputs are determined according to the first stored input value in the stored (N+1) input values.

BRIEF DESCRIPTION OF THE DRAWINGS

The accompanying drawings are included to provide a further understanding of the disclosure, and are incorporated in and constitute a part of this specification. The drawings illustrate examples and, together with the description, serve to explain the principles of the disclosure. In the drawings.

DETAILED DESCRIPTION

Figure 1:
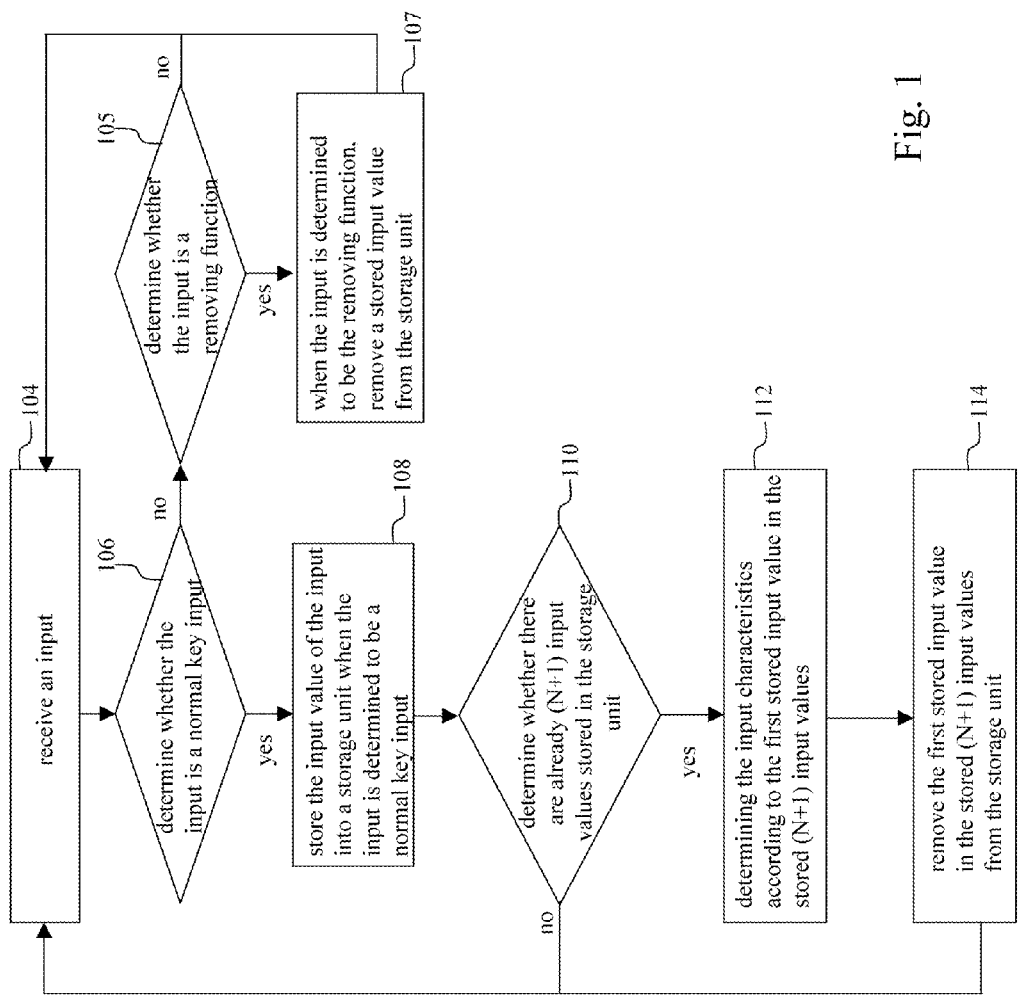
FIG. 1 is a flow chart illustrating an exemplary method for automatic learning of software keyboard input characteristics.

Reference will now be made in detail to the example of this disclosure, examples of which are illustrated in the accompanying drawings. Wherever possible, the same reference numbers are used in the drawings and the description to refer to the same or like parts.

First of all, it should be noted that a problem might come up when the process of pre-executing a separate calibration program is removed. When the calibration program is being executed, users are asked to follow the on-screen instructions and press down the corresponding keys on the software keyboard. Therefore, after the so-called "training mode" is completed, the calibration program has used the obtained data to determine the input characteristics of a user's input using the software keyboard. Next time, when the user presses down the same key again, the input characteristics can be used to calibrate the software keyboard input so as to enhance the correction rate of the user input via the software keyboard.

However, since the objective of the following exemplary method is aimed at collecting correct input values dynamically during the user's common input routine, so the primary problem is that the program collecting the input values has no clue of which key the user is intended to press down at that moment. For example, if the touch coordinate $(x_i, y_i)$ is obtained from the user, and the screen shows that the key 'K' is what the user just pressed down, there is no way of knowing whether the touch coordinate $(x_i, y_i)$ was actually intended for the key 'K'. Thus, there is no way to know whether the touch coordinate $(x_i, y_i)$ could be regarded as a correct input value for the key 'K'.

Accordingly, the exemplary automatic learning of software keyboard input characteristics adopts the concept of delay in learning. Instead of determining the key values and characteristics at the moment when the user presses down a key, 1-key delay, 2-key delay, or more are adopted. This concept can be dubbed as "N-key delay automatic learning." The main objective of this concept is to collect input values more effectively in order to determine the input characteristics more accurately. With the accurate input characteristics, the software keyboard input can then be calibrated accurately.

FIG. 1 is a flow chart illustrating an exemplary method for automatic learning of software keyboard input characteristics. In an exemplary computer program product may perform various steps of this method with program codes. This method includes the following steps. (It should be understood that the order of steps involved in this description may be adjusted according to the actual practices. The steps or part of the steps may be performed at the same time.)

(1) Receive an input (step 104). For each input, the input values received may include the key value as well as the touch coordinate of the input. For example, <'S', (101, 42)> means that the touch coordinate is (101, 42) and the key value outputted by the program is 'S'.

(2) Determine whether the input is a normal key input (step 106). The normal key input may be characters, such as letters of the alphabet, numbers, or punctuation.

(3) When the input is determined to be a normal key input, store the input value into a storage unit (step 108). The storage unit may store the input values with a data structure such as a circular queue. Moreover, whether the input is a removing function may be determined (step 105). When the input is determined to be the removing function, remove a stored input value from the storage unit (step 107). For example, the last input value stored into the circular queue is deleted.

(4) Determine whether there are already (N+1) input values stored in the storage unit, where N is a positive integer (step 110). If this is the case, then proceed to the next step. Otherwise, repeat steps 104-108 until there are already (N+1) input values stored in the storage unit. In one alternative, if the data structure implemented with the storage unit is a circular queue with (N+1) elements, steps 104-108 will be repeated until the circular queue is full.

(5) When there are already (N+1) input values stored in the storage unit, determine the input characteristics according to the first stored input value in the stored (N+1) input values (step 112). In one alternative, when the data structure is a circular queue, a head and/or a rear may be designated. When the circular queue is full, determine, according to the stored input value at the head or at the rear, the input characteristics of the input at the head or at the rear in order to do the learning.

(6) Remove the first stored input value in the stored (N+1) input values from the storage unit (step 114). This step removes the data that is already learned. For example, when N is set to 1, the so-called "1-key delay", at step 112, determine, according to the input value of the first stored input, the input characteristics of the first input. After the input characteristics of the first input are determined, remove the first stored input value. In one alternative, when the data structure is a circular queue, remove the input value at the head or at the rear depending on the designation on the head or on the rear.

(7) Repeat steps 104-114.

Figure 2:
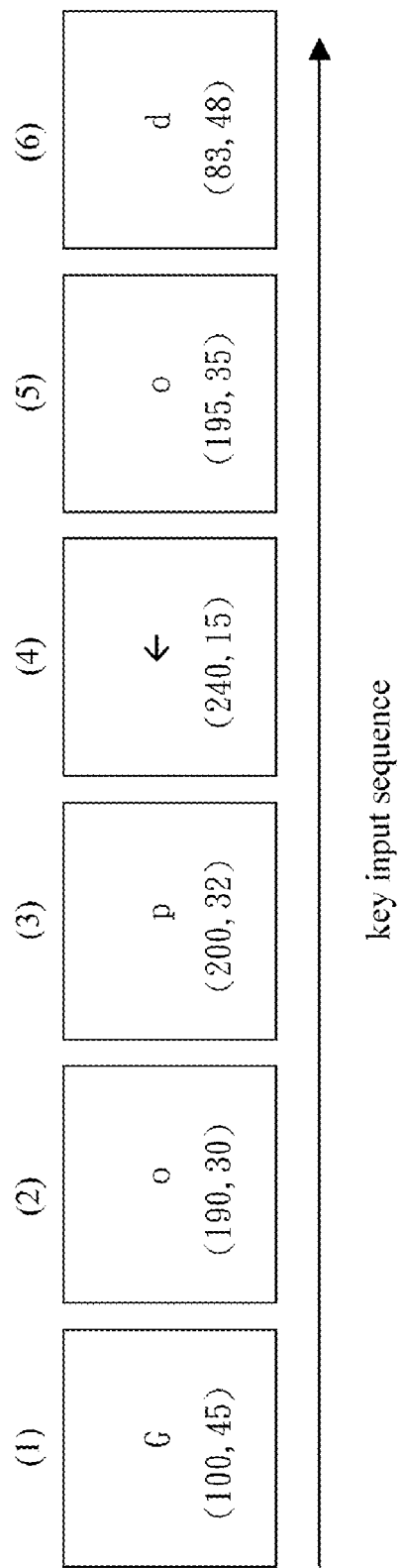
FIG. 2 is a diagram illustrating an exemplary 1-key delay automatic learning.

An exemplary process will be described next. FIG. 2 is a diagram illustrating an exemplary 1-key delay automatic learning. As far as the algorithm design, various appropriate data structures may be applied so as to save the memory space or enhance the computing speed. Here a circular queue is applied. Each set of the input value stored inside the queue includes a key value and the touch coordinate of the pressed key. The set may be represented as <key value, $(X_i, Y_i)$>. For example, <'S', (101, 42)> means that touch coordinate is (101, 42) and the key value outputted by the program is 'S'.

In this case, assume that the user is intended to enter the word 'Good'. However, when the user presses down the second 'o' character, the program outputs the character 'p' instead of the character 'o' since the program determines that the received touch coordinate to be closer to the character 'p'.

Then, the user presses down the backspace key '←' and enter the character 'o' and the last character 'd', as shown in FIG. 2. Detailed descriptions regarding each step are stated below for illustration:

(1) Here N is set to 1, i.e. the 1-key delay automatic learning. When the user presses down the first key 'G', it is determined to be a normal key input. The input values are placed into the storage unit. However, the input characteristics of the character 'G' will not be determined according to the input value <'G', (100, 45)> immediately.

(2) When the user presses down the second key 'o', the input is determined to be a normal key input. The input values are placed into the storage unit, and the input characteristics of the first input stored before this input (i.e. the proceeding input) are determined. That is, the input characteristics of the character 'G' are determined according to the input value <'G', (100, 45)> so as to do the learning. This exemplary method uses the second character inputted by the user to determine whether the first input is the desired user input. If the second input is a normal key input, it generally means that the first input is the desired user input. If the second input is the other input such as the backspace or arrow key, it generally means that the first input is not the desired user input.

In this case, the so-called input characteristics may be the coordinate shift direction and the coordinate shift amount when the user presses down the software key. For example, if the default origin of the software key 'G' is (100,50), the input characteristics may be determined to be a 5-unit shift in the Y direction when the touch coordinate received from the user is (100, 45). Therefore, after the input characteristics of the character 'G' are determined according to the input value <'G', (100, 45)>, the origin of the software key 'G' may be calibrated in the Y direction. Then, the successful rate of inputting the character 'G' by the user will increase afterwards.

(3) When the user presses down the third key 'p', the input is determined to be a normal key input. The input value is placed into the storage unit, and the input characteristics of the proceeding input are determined. That is, according to the input value <'o', (190, 30)>, the input characteristics of the character 'o' are determined so as to do the learning.

(4) When the user presses down the forth key '←', the input is determined not to be a normal key input. It is a removing function to remove the proceeding input, so the proceeding input would be deleted. That is, the input value <'p', (200, 32)> would be deleted from the storage unit.

(5) When the user presses down the fifth key 'o', the input is determined to be a normal key input. The proceeding valid input (the second input, which is stored in the storage unit before the input value <'o', (195, 35)>) is learned. That is, according to the input value <'o', (190, 30)>, the input characteristics of the character 'o' are determined so as to do the learning.

(6) When the user presses down the sixth key 'd', the input is determined to be a normal key input. The input characteristics of the proceeding input are determined. That is, according to the input value <'o', (195, 35)>, the input characteristics of the character 'o' are determined so as to do the learning.

Figure 3A:
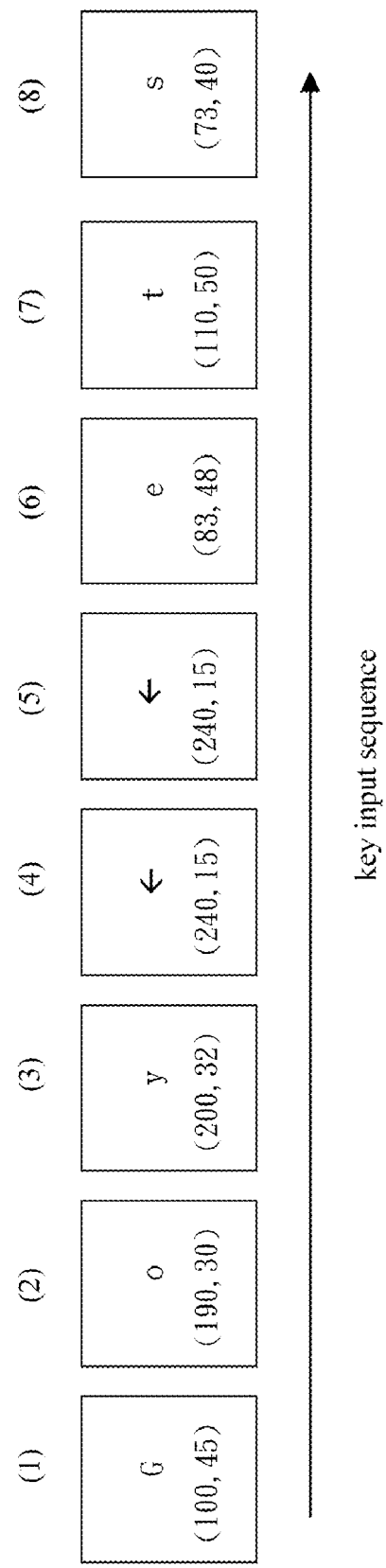
FIG. 3A is a diagram illustrating an exemplary 2-key delay automatic learning.
Figure 3B:
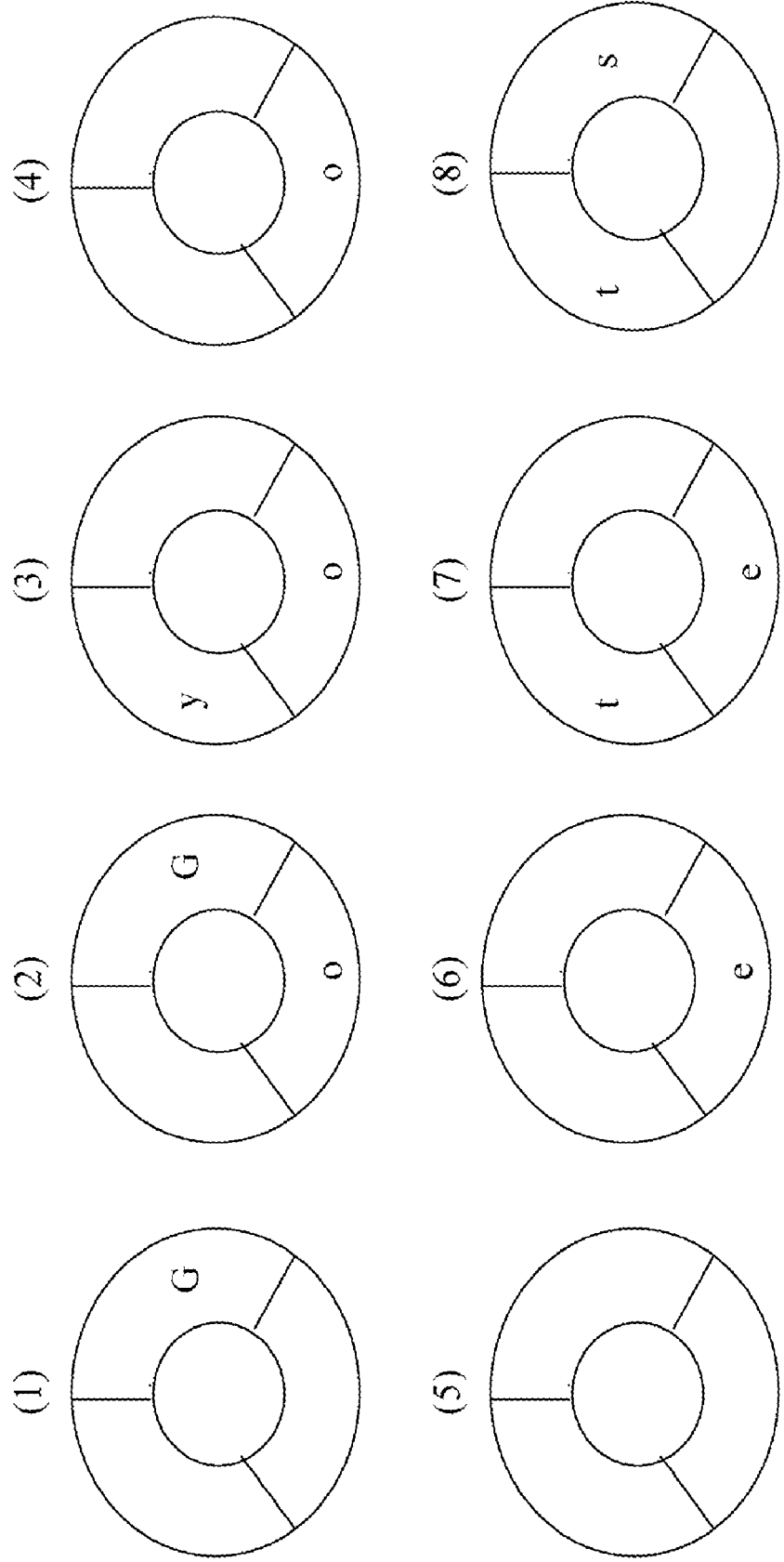
FIG. 3B is a diagram illustrating an exemplary circular queue.

Another exemplary process will be described next. FIG. 3A is a diagram illustrating an exemplary 2-key delay automatic learning. FIG. 3B is a diagram illustrating an exemplary circular queue.

In this example, assume that the user is intended to enter this word 'Gets'. However, the user sees the mistake after entering 'Goy'. So, the user presses the backspace key '←' twice and enters 'ets' to complete, as shown in FIG. 3A. Detailed descriptions regarding each step are stated below for illustration:

(1) Here N is set to 2, i.e. the 2-key delay automatic learning. When the user presses down the first key 'G', the input is determined to be a normal key input. The input value <'G', (100, 45)> is placed into the circular queue. However, the input characteristics of the character 'G' will not be determined according to the input value immediately.

(2) When the user presses down the second key 'o', the input is determined to be a normal key input. The input value <'o', (190, 30)> is placed into the circular queue. However, the input characteristics of the character 'o' will not be determined according to the input value immediately.

(3) When the user presses down the third key 'y', the input is determined to be a normal key input. The input value is placed into the circular queue, and the circular queue reaches the full state at this moment. Thus, the input characteristics of the second input stored before the current input are determined. That is, according to the input value <'G', (100, 45)>, the input characteristics of the character 'G' are determined so as to do the learning. After that, the input value <'G', (100, 45)> is removed from the circular queue.

(4) When the user presses down the forth key '←', the input is determined not to be a normal key input. It is a removing function to remove the proceeding input, so the input value of the proceeding input 'y' would be deleted. That is, the input value <'y', (200, 32)> would be deleted from the circular queue.

(5) When the user presses down the fifth key '←', the input is determined not to be a normal key input. It is a removing function to remove the proceeding input, so the input value of the proceeding input 'o' would be deleted. That is, the input value <'o', (190, 30)> would be deleted from the circular queue.

(6) When the user presses down the sixth key 'e', the input is determined to be a normal key input. The input value <'e', (83, 48)> is placed into the circular queue. However, the input characteristics of the character 'e' will not be immediately according to the input value immediately.

(7) When the user presses down the seventh key 't', the input is determined to be a normal key input. The input value <'t', (110, 50)> is placed into the circular queue. However, the input characteristics of the character 't' will not be determined according to the input value immediately.

(8) When the user presses down the eighth key 's', the input is determined to be a normal key input. The input value is placed into the circular queue, and the circular queue reaches the full state at this moment. Thus, the input characteristics of the second input stored before the current input are determined. That is, according to the input value <'e', (83, 48)>, the input characteristics of 'e' are determined so as to do the learning. After that, the input value <'e', (83, 48)> is removed from the circular queue.

Figure 4:
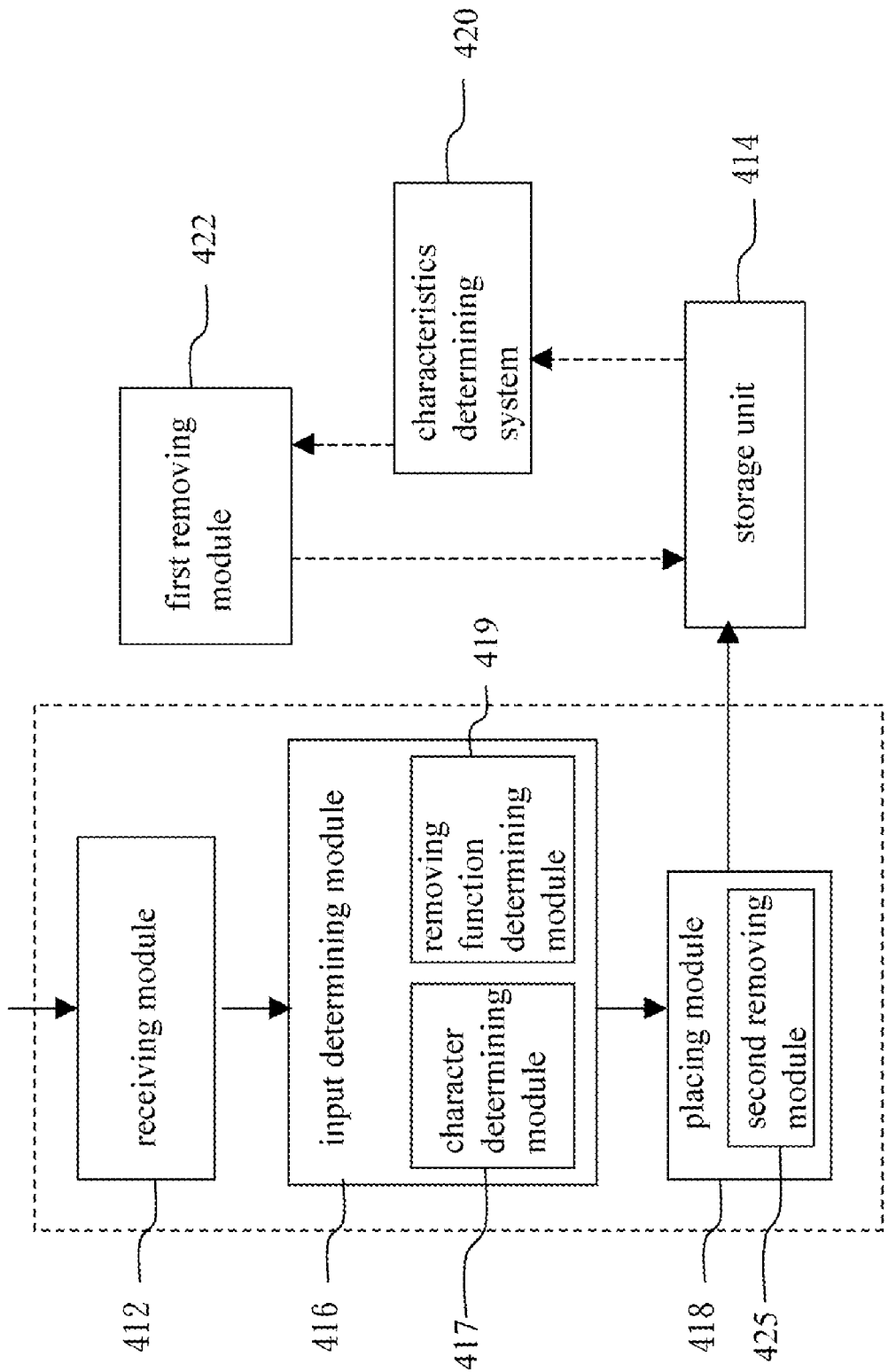
FIG. 4 is a block diagram illustrating an exemplary system for automatic learning of software keyboard input characteristics.

FIG. 4 is a block diagram illustrating an exemplary system for automatic learning of software keyboard input characteristics. This system includes a receiving module 412, a storage unit 414, an input determining module 416, a placing module 418, a characteristics determining system 420, and a first removing module 422. The receiving module 412 is for receiving the input value of an input. The input value received by the receiving module 412 includes the key value and the touch coordinate of the input such as <'S', (101, 42)>. The storage unit 414 is for storing the input value. The input determining module 416 is for determining whether the input is a normal key input. The input determining module 416 may include a character determining module 417 in order to determine whether the key value of the input is a character such as an alphabet, a number or a punctuation when the input is a normal key input. The input determining module 416 may also include a removing function determining module 419 in order to determine whether the input is a removing function when the input is not a normal key input. The placing module 418 may include a second removing module 425 in order to remove data stored in the storage unit 414.

When the input determining module 416 determines the input to be the normal key input, the placing module 418 places the input value of the input into the storage unit 414. When the removing function determining module 419 determines the input is a removing function, the second removing module 425 removes an input value stored in the storage unit 414. For example, the last stored input value in the storage unit 414 is removed. The storage unit 414 may store the input value with a data structure such as a circular queue or other appropriate data structures. When the placing module 418 already places (N+1) input values into the storage unit 414, the characteristics determining system 420 determines the input characteristics of the first input in the (N+1) inputs according to the first stored input value in the stored (N+1) input values, wherein N is a positive number. The first removing module 422 is for removing the first stored input value in the stored (N+1) input values from the storage unit 414.

The receiving module 412, the input determining module 416, and the placing module 418 repeats their operation until there are already (N+1) input values being placed into the storage unit 414. Then, the characteristics determining system 420 determines the input characteristics of the first input in the (N+1) inputs according to the first stored input value in the stored (N+1) input values. After the characteristics determining system 420 determines the input characteristics, the first removing module 422 removes the first stored input value in the stored (N+1) input values, and the receiving module 412, the input determining module 416, and the placing module 418 (as shown inside the dashed line in the figure) in turn will start aforementioned operation again.

In addition, the following discussion may be considered when it comes to setting the positive integer N: The smaller the N is, the sooner the circular queue will be filled up. The input characteristics will be learned by the system faster. That is, the learning speed is faster. Therefore, if the user changes operating characteristics, the disclosure may perform automatic learning and self-adaption within a shorter period of time.

The bigger the N is, the slower the circular queue will be filled up. The learning speed is slower. If the user fixes one or more inputs before the input characteristics are learned by the system, there is still a chance to remove the data from the circular queue. Therefore, it reduces the chance of learning inappropriate input characteristics.

To sum up, the aforementioned exemplary method, system, and computer program product for automatic learning of software keyboard input characteristics. The user does not need to run a calibration program before starting to input data. If the user inputs the same character in the future, the system may use the learned input characteristics to predict or fix the input value. There is no need to pre-construct coordinate calibration data through a separate routine, yet the effect of coordinate calibration can be achieved and the accuracy of input determination can be enhanced. During the user input process, if the user changes operating characteristics, the automatic learning and self-adaption may be performed accordingly.

It will be apparent to those skilled in the art that various modifications and variations can be made to the structure of the example without departing from the scope or spirit. In view of the foregoing, it is intended that the example cover modifications and variations of this disclosure provided they fall within the scope of the following claims and their equivalents.

What is claimed is:

1. A method for automatic learning of software keyboard input characteristics comprising the following steps:
   (a) receiving an input;
   (b) determining whether the input is a normal key input;
   (c) storing the input value of the input when the input is determined to be the normal key input, wherein the input value of the input comprises the key value and the touch coordinate of the input;
   (d) repeating step (a)-(c) until (N+1) input values are stored, wherein N is a positive integer;
   (e) determining, according to the first stored input value in the stored (N+1) input values, the input characteristics of the first input in the (N+1) inputs when there are (N+1) inputs stored by determining the touch coordinate of the first input corresponding to the key value of the first input; and
   (f) removing the first stored input value in the stored (N+1) input values.

2. The method of claim 1, further comprising the following step:
   determining whether the input is a removing function; and removing a stored input value when the input is determined to be the removing function.

3. The method of claim 2, wherein the removed input value is the last stored input value among the stored input values.

4. The method of claim 1, wherein the input characteristics of the first input in the (N+1) inputs comprise a coordinate shift direction and a coordinate shift amount.

5. The method of claim 1, wherein the normal key input is a character.

6. The method of claim 5, wherein the character is an alphabet, number or punctuation.

7. A system for automatic learning of software keyboard input characteristics comprising:
   a receiving module for receiving an input;
   a storage unit for storing the input value of the input;
   an input determining module for determining whether the input is a normal key input;
   a placing module for placing the input value of the input into the storage unit when the input determining module determines the input to be the normal key input, wherein the input value of the input comprises the key value and the touch coordinate of the input;
   a characteristics determining system for determining, according to the first stored input value in the stored (N+1) input values, the input characteristics of the first input in the (N+1) inputs when there are already (N+1) input values stored in the storage unit by determining the touch coordinate of the first input corresponding to the key value of the first input, wherein N is a positive number; and
   a first removing module for removing the first stored input value in the stored (N+1) input values after the input characteristics of the first input in the (N+1) inputs are determined.

8. The system of claim 7, wherein the input determining module comprises a removing function determining module for determining whether the input is a removing function.

9. The system of claim 8, wherein the placing module comprises a second removing module for removing an input value stored in the storage unit when the removing function determining module determines the input to be the removing function.

10. The system of claim 9, wherein the second removing module removes the last stored input value among the stored input values in the storage unit when removing the input value stored in the storage unit.

11. The system of claim 7, wherein the input characteristics of the first input in the (N+1) inputs comprise a coordinate shift direction and a coordinate shift amount.

12. The system of claim 7, wherein the normal key input is a character.

13. The system of claim 12, wherein the character is an alphabet, number or punctuation.

14. The system of claim 7, wherein the storage unit stores the input value of the input with a data structure.

15. The system of claim 14, wherein the data structure is a circular queue.

16. A computer storage medium storing program codes for executing the following steps:
   (a) receiving an input;
   (b) determining whether the input is a normal key input;
   (c) storing the input value of the input when the input is determined to be the normal key input, wherein the input value of the input comprises the key value and the touch coordinate of the input;
   (d) repeating step (a)-(c) until (N+1) input values are stored, wherein N is a positive integer;
   (e) determining, according to the first stored input value in the stored (N+1) input values, the input characteristics of the first input in the (N+1) inputs when there are (N+1) inputs stored by determining the touch coordinate of the first input corresponding to the key value of the first input; and
   (f) removing the first stored input value in the stored (N+1) input values.

17. The computer storage medium of claim 16, further comprising the following step:

determining whether the input is a removing function; and removing a stored input value when the input is determined to be the removing function.

18. The computer storage medium of claim 17, wherein the removed input value is the last stored input value among the stored input values.

19. The computer storage medium of claim 16, wherein the input characteristics of the first input in the (N+1) inputs comprise a coordinate shift direction and a coordinate shift amount.

20. The computer storage medium of claim 16, wherein the normal key input is a character.

21. computer storage medium of claim 20, wherein the character is an alphabet, number or punctuation.

\* \* \* \* \*